United States Patent
Gou et al.

(10) Patent No.: US 11,386,589 B2
(45) Date of Patent: Jul. 12, 2022

(54) METHOD AND DEVICE FOR IMAGE GENERATION AND COLORIZATION

(71) Applicant: Ping An Technology (Shenzhen) Co., Ltd., Shenzhen (CN)

(72) Inventors: Yuchuan Gou, Sunnyvale, CA (US); Minghao Li, Mountain View, CA (US); Bo Gong, Belmont, CA (US); Mei Han, Palo Alto, CA (US)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 23 days.

(21) Appl. No.: 17/122,680

(22) Filed: Dec. 15, 2020

(65) Prior Publication Data

US 2022/0044451 A1   Feb. 10, 2022

Related U.S. Application Data

(60) Provisional application No. 63/060,784, filed on Aug. 4, 2020.

(51) Int. Cl.
*G06T 11/00* (2006.01)
*G06N 3/04* (2006.01)
*G06V 10/56* (2022.01)
*G06V 30/262* (2022.01)

(52) U.S. Cl.
CPC .......... *G06T 11/001* (2013.01); *G06N 3/0454* (2013.01); *G06V 10/56* (2022.01); *G06V 30/274* (2022.01)

(58) Field of Classification Search
CPC ........ G06T 11/001; G06T 2207/20084; G06V 10/56; G06V 30/274; G06N 3/0454; G06N 3/02
See application file for complete search history.

(56) References Cited

U.S. PATENT DOCUMENTS

| | | | |
|---|---|---|---|
| 2019/0244060 A1* | 8/2019 | Dundar | G06T 15/00 |
| 2019/0295302 A1* | 9/2019 | Fu | G06T 11/60 |
| 2020/0242771 A1* | 7/2020 | Park | G06N 3/088 |
| 2020/0302173 A1* | 9/2020 | Deng | G06V 20/20 |
| 2021/0192338 A1* | 6/2021 | Barkan | G06T 7/0002 |

* cited by examiner

*Primary Examiner* — Antonio A Caschera
(74) *Attorney, Agent, or Firm* — Anova Law Group, PLLC

(57) ABSTRACT

A method for image generation and colorization includes displaying a drawing board interface; obtaining semantic labels of an image to be generated based on user input on the drawing board interface, each semantic label indicating a content of a region in the image to be generated; obtaining a color feature of the image to be generated; and automatically generating the image using a generative adversarial network (GAN) model according to the semantic labels and the color feature. The color feature is a latent vector input to the GAN model.

18 Claims, 5 Drawing Sheets
(4 of 5 Drawing Sheet(s) Filed in Color)

METHOD AND DEVICE FOR IMAGE GENERATION AND COLORIZATION

CROSS-REFERENCE TO RELATED APPLICATION

This application claims the priority of U.S. Provisional Patent Application No. 63/060,784, filed on Aug. 4, 2020, the entire contents of which are incorporated herein by reference.

FIELD OF THE DISCLOSURE

The present disclosure relates to the field of image processing technologies and, more particularly, relates to method and device for image generation and colorization.

BACKGROUND

In existing technology, image generation models can be used to generate images unsupervised or conditioned on user input such as texts and semantic labels. However, in these generation models, colors cannot be edited locally once a result image is generated.

Apart from the image generation models, colorization is another popular research area these years, such as scribble-based colorization method that applies scribbles to an edge input, and color transfer method that transfers global color tone from reference image to the input, usually a grayscale one. However, these models aim for pure colorization, and does not have image generation abilities.

The disclosed method and system are directed to solve one or more problems set forth above and other problems.

BRIEF SUMMARY OF THE DISCLOSURE

One aspect of the present disclosure provides a method for image generation and colorization. The method includes: displaying a drawing board interface; obtaining semantic labels of an image to be generated based on user input on the drawing board interface, each semantic label indicating a content of a region in the image to be generated; obtaining a color feature of the image to be generated; and automatically generating the image using a generative adversarial network (GAN) model according to the semantic labels and the color feature. The color feature is a latent vector input to the GAN model.

Another aspect of the present disclosure provides a device for image generation and colorization. The device includes a memory and a processor coupled to the memory. The processor is configured to perform: displaying a drawing board interface; obtaining semantic labels of an image to be generated based on user input on the drawing board interface, each semantic label indicating a content of a region in the image to be generated; obtaining a color feature of the image to be generated; and automatically generating the image using a generative adversarial network (GAN) model according to the semantic labels and the color feature. The color feature is a latent vector input to the GAN model.

Another aspect of the present disclosure provides a non-transitory computer readable storage medium that has computer instructions stored thereon. The computer instructions can, when being executed by a processor, cause the processor to perform: displaying a drawing board interface; obtaining semantic labels of an image to be generated based on user input on the drawing board interface, each semantic label indicating a content of a region in the image to be generated; obtaining a color feature of the image to be generated; and automatically generating the image using a generative adversarial network (GAN) model according to the semantic labels and the color feature. The color feature is a latent vector input to the GAN model.

Other aspects of the present disclosure can be understood by those skilled in the art in light of the description, the claims, and the drawings of the present disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following drawings are merely examples for illustrative purposes according to various disclosed embodiments and are not intended to limit the scope of the present disclosure.

DETAILED DESCRIPTION

Reference will now be made in detail to exemplary embodiments of the invention, which are illustrated in the accompanying drawings. Hereinafter, embodiments consistent with the disclosure will be described with reference to the drawings. Wherever possible, the same reference numbers will be used throughout the drawings to refer to the same or like parts. It is apparent that the described embodiments are some but not all of the embodiments of the present invention. Based on the disclosed embodiments, persons of ordinary skill in the art may derive other embodiments consistent with the present disclosure, all of which are within the scope of the present invention.

The present disclosure provides a method and device for image generation and colorization. The disclosed method and/or device can be applied to implement an artificial intelligence (AI) drawing board based on Generative Adversarial Networks (GAN). The GAN-based drawing board is configured to obtain user inputs of semantic cue(s) (e.g., through segmentation) and color tone(s) (e.g., by strokes), and automatically generate an image (e.g., a painting) based on the user inputs. The disclosed method is built on a novel and lightweight color feature embedding technique which incorporates the colorization effects into the image generation process. Unlike existing GAN-based image generation models which only take semantics input, the disclosed drawing board has the ability to edit local colors of an image after being generated. The color information may be sampled from user-entered strokes as extra input, and fed into a GAN model for conditional generation. The disclosed method and device enable creation of pictures or paintings with both semantics control and color control. In other words, the disclosed method and device incorporate colorization into image generation process so that object position, shape and color can be controlled at the same time. The image creation may be performed in real-time.

Figure 1:
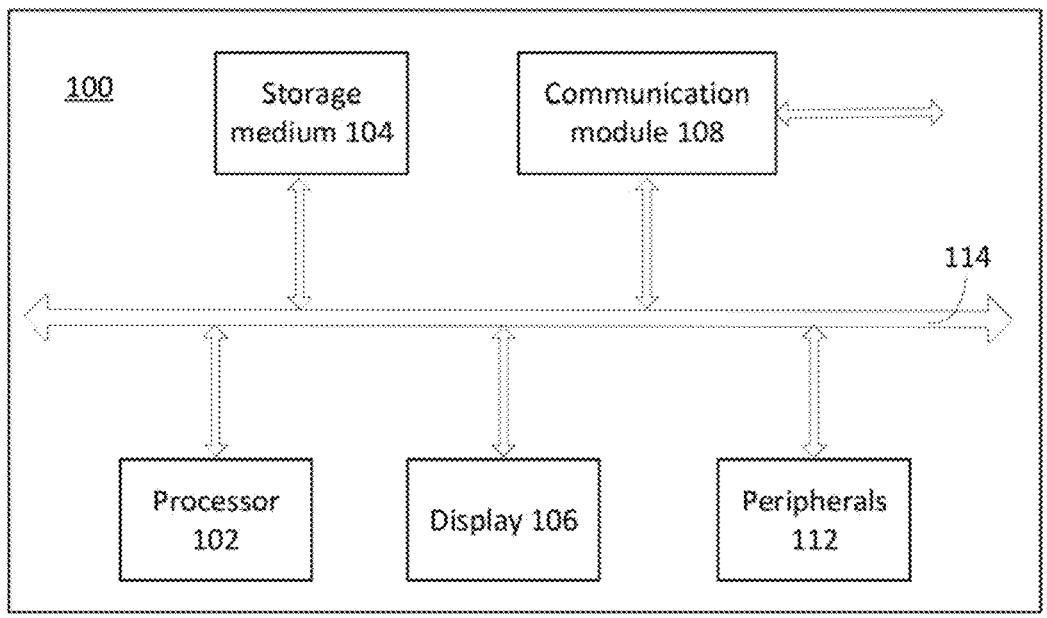
FIG. 1 is a block diagram of an exemplary computing system according to some embodiments of the present disclosure.

FIG. 1 is a block diagram of an exemplary computing system/device capable of implementing the disclosed image generation and colorization method according to some embodiments of the present disclosure. As shown in FIG. 1, computing system 100 may include a processor 102 and a storage medium 104. According to certain embodiments, the computing system 100 may further include a display 106, a communication module 108, additional peripheral devices 112, and one or more bus 114 to couple the devices together. Certain devices may be omitted and other devices may be included.

Processor 102 may include any appropriate processor(s). In certain embodiments, processor 102 may include multiple cores for multi-thread or parallel processing, and/or graphics processing unit (GPU). Processor 102 may execute sequences of computer program instructions to perform various processes, such as an image generation and colorization program, a GAN model training program, etc. Storage medium 104 may be a non-transitory computer-readable storage medium, and may include memory modules, such as ROM, RAM, flash memory modules, and erasable and rewritable memory, and mass storages, such as CD-ROM, U-disk, and hard disk, etc. Storage medium 104 may store computer programs for implementing various processes, when executed by processor 102. Storage medium 104 may also include one or more databases for storing certain data such as image data, training data set, testing image data set, data of trained GAN model, and certain operations can be performed on the stored data, such as database searching and data retrieving.

The communication module 108 may include network devices for establishing connections through a network. Display 106 may include any appropriate type of computer display device or electronic device display (e.g., CRT or LCD based devices, touch screens). Peripherals 112 may include additional I/O devices, such as a keyboard, a mouse, and so on.

In operation, the processor 102 may be configured to execute instructions stored on the storage medium 104 and perform various operations related to an image generation and colorization method as detailed in the following descriptions.

Figure 2:
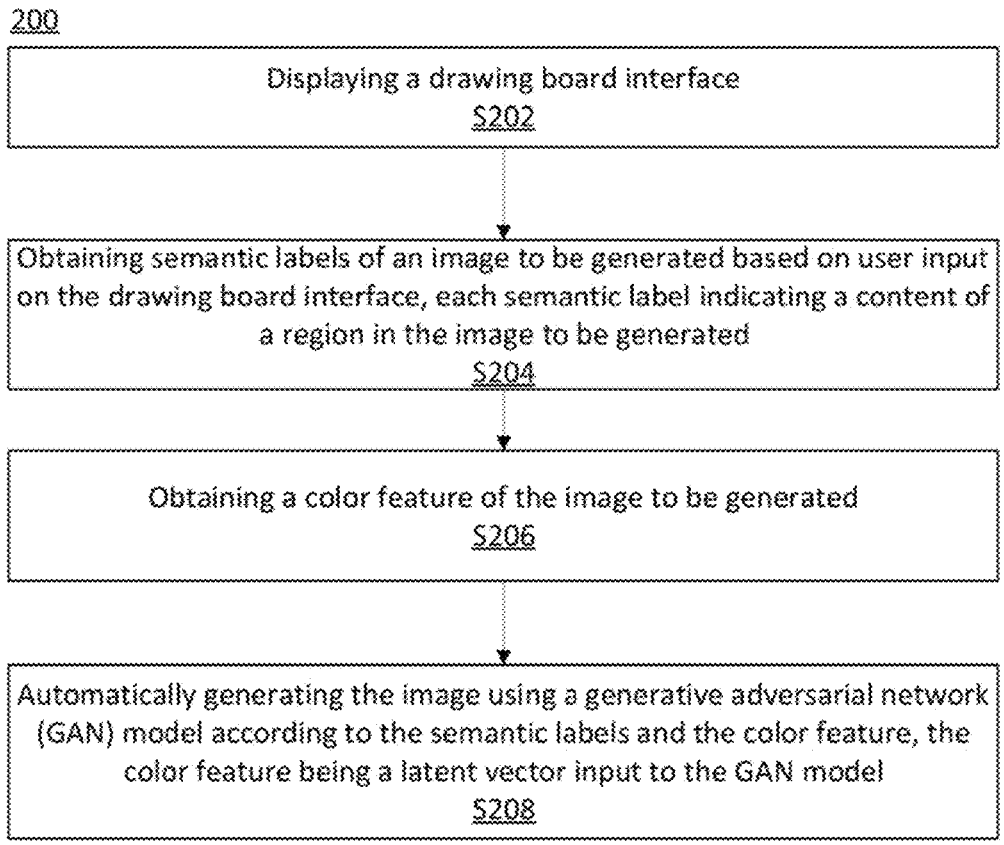
FIG. 2 illustrates an exemplary image generation and colorization process according to some embodiments of the present disclosure.
Figure 4:
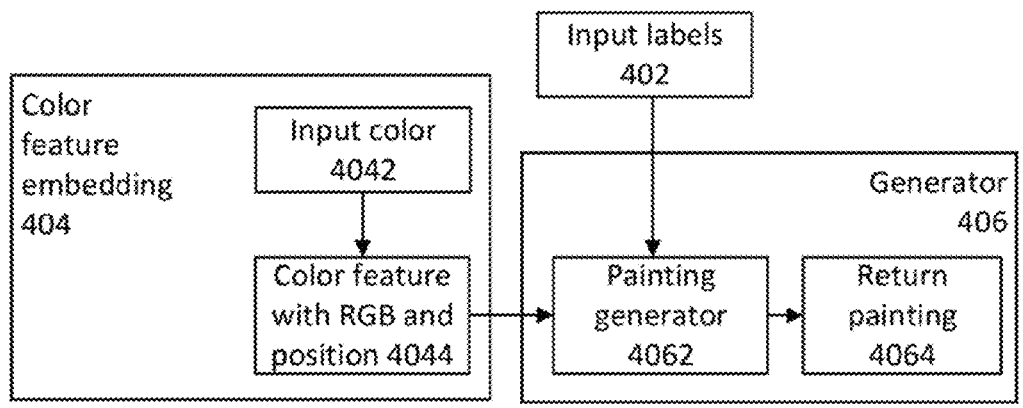
FIG. 4 is a block diagram illustrating an exemplary framework of image generation and colorization according to some embodiments of the present disclosure.

FIG. 2 illustrates an exemplary image generation and colorization process 200 according to some embodiments of the present disclosure. FIG. 4 is a block diagram illustrating an exemplary framework 400 of image generation and colorization according to some embodiments of the present disclosure. The process 200 may be performed by any suitable computing device/server having one or more processors and one or more memories, such as computing system 100 (e.g. processor 102). The framework 400 may be implemented by any suitable computing device/server having one or more processors and one or more memories, such as computing system 100 (e.g. processor 102).

As shown in FIG. 2, a drawing board interface is displayed (S202). The drawing board interface may include multiple functions related to image generation and colorization. For example, semantic labels of an image to be generated may be obtained based on user input on the drawing board interface (S204). Each semantic label indicates a content of a region in the image to be generated. The semantic labels may also be referred as input labels 402 as shown in FIG. 4. The input labels 402 are one of the inputs for the generator 406 (e.g., the painting generator 4062).

Figure 3:
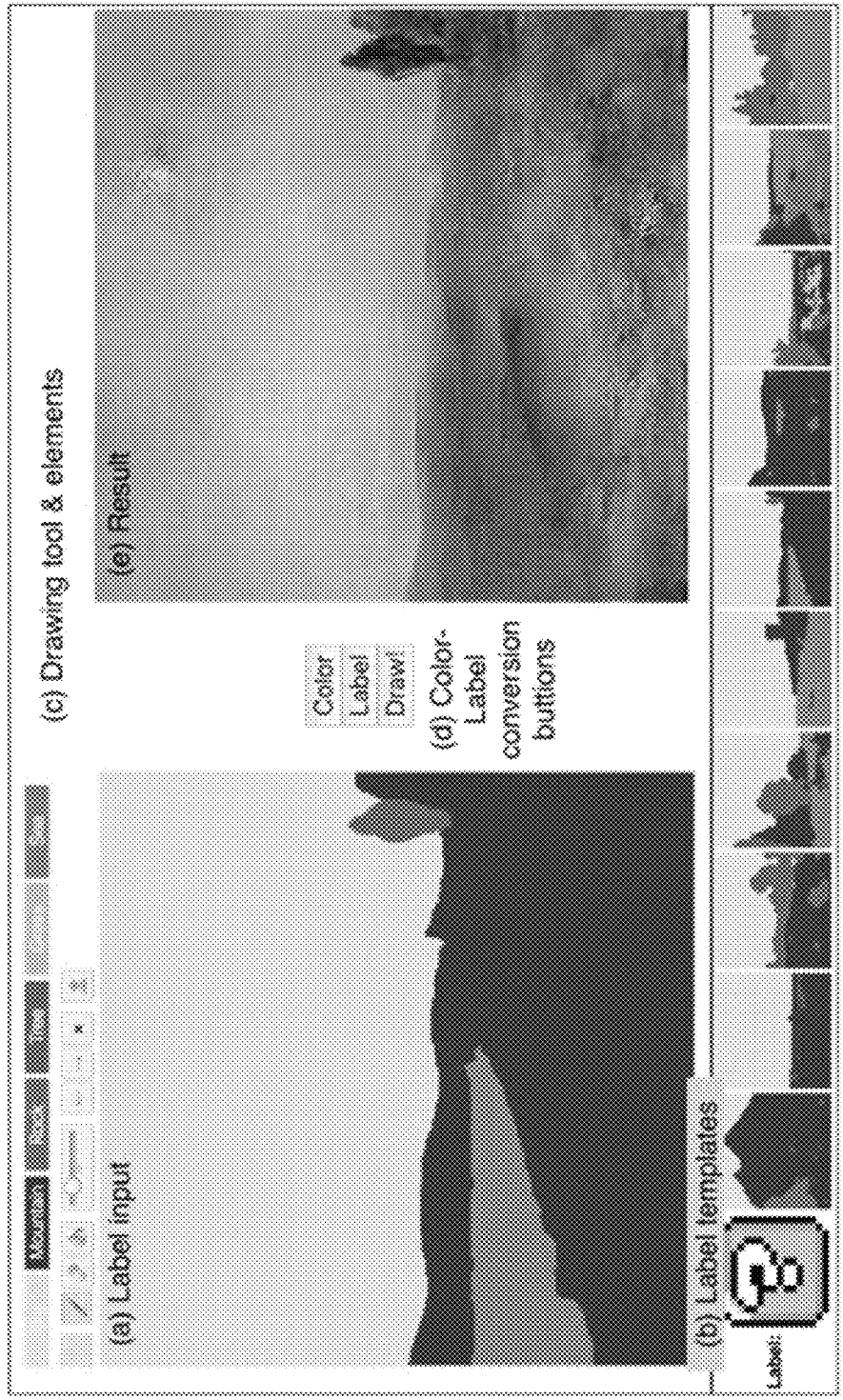
FIG. 3 illustrates an exemplary drawing board interface according to some embodiments of the present disclosure.

FIG. 3 illustrates an exemplary drawing board interface according to some embodiments of the present disclosure. As shown in FIG. 3, the drawing board interface may include a label input section (a). The label input may be presented in a format of semantic map. The semantic map, as used herein, may refer to a semantic segmentation mask of a target image (e.g., an image to be generated). The semantic map has the same size as the target image and is associated with a plurality of semantic labels, each pixel of the semantic map having a corresponding semantic label. Pixels with the same semantic label depict a same topic/content. In other words, the semantic map includes a plurality of regions, and pixels of a same region of the semantic map has a same semantic label indicating the content of the region. For example, a semantic map may include regions labeled as sky, mountain, rock, tree, grass, sea, etc. Such regions may also be referred as label images. That is, a semantic map may be processed into different label images, and each label image represents a different semantic label.

Figure 6A:
FIG. 6A is an example semantic map consistent with some embodiments of the present disclosure.
Figures 7A, 7B, 7C, 7D, 7E, 7F:
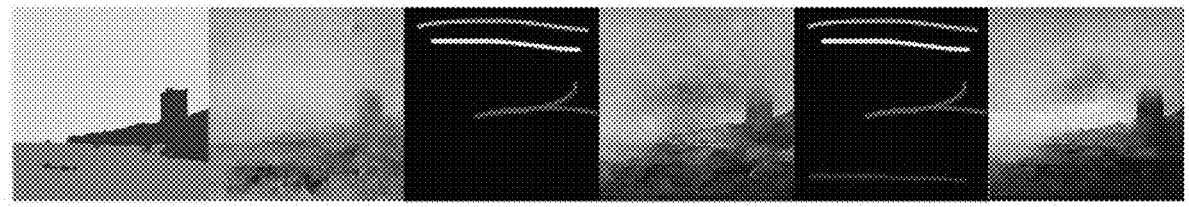
FIG. 7A is an example semantic map consistent with some embodiments of the present disclosure.
FIG. 7B is an image automatically generated using the example semantic map shown in FIG. 7A as an input for an image generation model according to some embodiments of the present disclosure.
FIG. 7C and FIG. 7E are two exemplary stroke images consistent with some embodiments of the present disclosure.
FIG. 7D is an image automatically generated using the example semantic map shown in FIG. 7A and the stroke image shown in FIG. 7C as inputs for the image generation model according to some embodiments of the present disclosure.
FIG. 7F is an image automatically generated using the example semantic map shown in FIG. 7A and the stroke image shown in FIG. 7E as inputs for the image generation model according to some embodiments of the present disclosure.
Figures 8A, 8B, 8C, 8D, 8E, 8F:
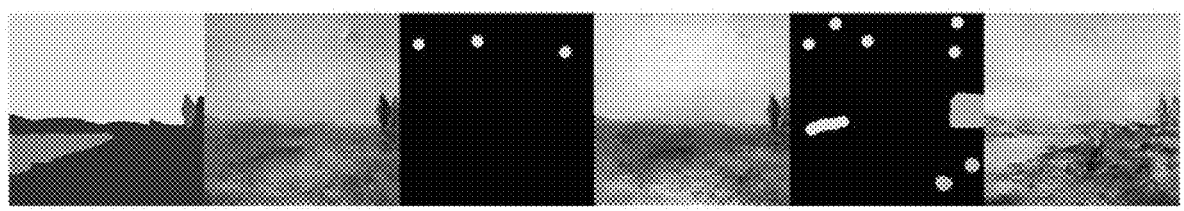
FIG. 8A is an example semantic map consistent with some embodiments of the present disclosure.
FIG. 8B is an image automatically generated using the example semantic map shown in FIG. 8A as an input for an image generation model according to some embodiments of the present disclosure.
FIGS. 8C, 8E, 8G, 8I, 8K, and 8M are exemplary stroke images consistent with some embodiments of the present disclosure.
FIG. 8D is an image automatically generated using the example semantic map shown in FIG. 8A and the stroke image shown in FIG. 8C as inputs for the image generation model according to some embodiments of the present disclosure.
FIG. 8F is an image automatically generated using the example semantic map shown in FIG. 8A and the stroke image shown in FIG. 8E as inputs for the image generation model according to some embodiments of the present disclosure.
Figures 8G, 8I, 8K, 8M:
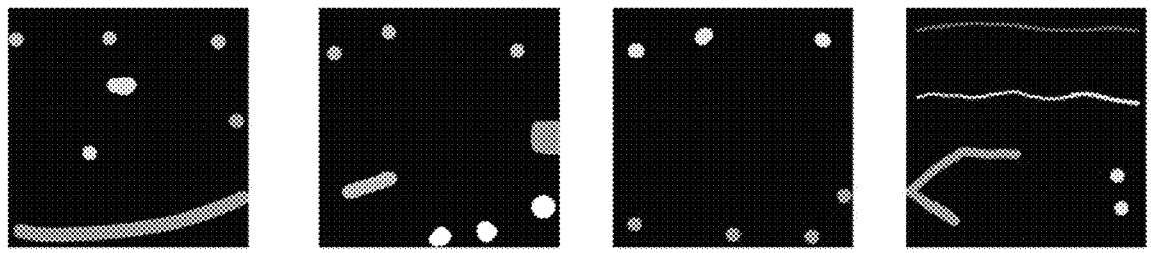
Figures 8H, 8J, 8L, 8N:
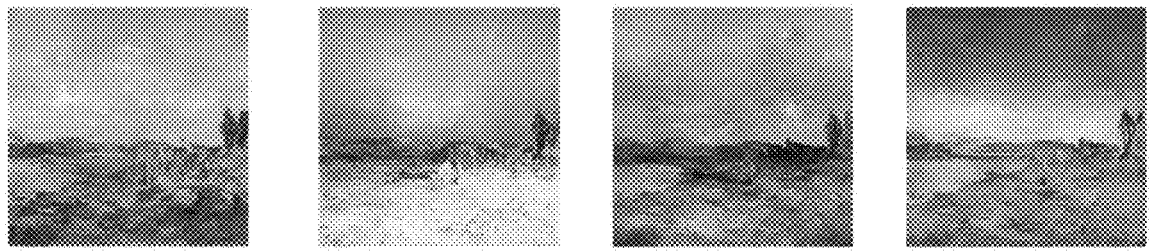
FIG. 8H is an image automatically generated using the example semantic map shown in FIG. 8A and the stroke image shown in FIG. 8G as inputs for the image generation model according to some embodiments of the present disclosure.
FIG. 8J is an image automatically generated using the example semantic map shown in FIG. 8A and the stroke image shown in FIG. 8I as inputs for the image generation model according to some embodiments of the present disclosure.
FIG. 8L is an image automatically generated using the example semantic map shown in FIG. 8A and the stroke image shown in FIG. 8K as inputs for the image generation model according to some embodiments of the present disclosure.
FIG. 8N is an image automatically generated using the example semantic map shown in FIG. 8A and the stroke image shown in FIG. 8M as inputs for the image generation model according to some embodiments of the present disclosure.

In some embodiments, the semantic map may be obtained based on user drawing operations on the drawing board interface (e.g., after the "label" button is selected in the Color-Label conversion buttons section (d) of FIG. 3). For example, the drawing board interface may provide drawing tools for the user to sketch a semantic map (e.g., tools shown in the drawing tool and elements section (c) of FIG. 3). The drawing tools may include common painting functions such as, pencil, eraser, zoom in/out, color fill, etc. The use can sketch outlines/edges of different regions describing different components of a desired image using the drawing tools. Semantic label text may be assigned by the user to each region of the semantic map. For example, the semantic label texts may be displayed on the drawing board interface, each semantic label text having a unique format functioning as a legend of the corresponding region. Each region of the semantic map shown in the drawing board interface is formatted based on the format of the corresponding semantic label text. The unique format generally means that region with different semantic label would not have the same format. The format may be a color, and/or a pattern (e.g., dotted region, striped region). For example, when using colors to denote object types, a region associated with semantic label "sky" has a light blue color, region associated with semantic label "sea" has a deep blue color. FIG. 6A is an example semantic map consistent with some embodiments of the present disclosure. Similarly, FIG. 7A and FIG. 8A are two other example semantic maps.

In some embodiments, the semantic labels may be obtained based on a semantic map template. In one example, the drawing board interface may provide candidate options of semantic maps (e.g., as shown in label templates section (b) of FIG. 3). The user may select a desired template among the candidate options. In another example, the drawing board interface may read a previously-created image from a local or online storage and obtain user-assigned semantic label texts to regions in the previously-created image. The labelled image may be used as the semantic map template.

In some embodiments, the semantic map template may be directly used to obtain the semantic labels. In some other embodiments, the user may modify the semantic map, such as modifying a semantic label text corresponding to a region (one or more pixels) of the semantic map, or modifying a location of a region corresponding to a semantic label text (e.g., by using the drawing tools provided by the drawing board interface).

Returning to FIGS. 2 and 4, a color feature of the image to be generated is obtained (S206). The color feature may be extracted by the color feature embedding element 404. Input color 4042 are first obtained based on user input or default settings, and the extracted color feature with color values (e.g., RGB values) and position 4044 is one of the inputs for the generator 406 (e.g., the painting generator 4062).

The customized colorization are implemented based on feature embedding. The input color 4042 guided by user customization may include a stroke image. The stroke image have the same size as the target image and includes one or more strokes entered by the user. Each stroke is formed by connected pixels and has a corresponding stroke color. FIGS. 6C, 6E, 7C, 7E, 8C, 8E, 8G, 8I, 8K, and 8M are exemplary stroke images consistent with some embodiments of the present disclosure. For example, the stroke image shown in FIG. 6C has the same size as the target image, which has the same size the semantic map shown in FIG. 6A. The background of the stroke image is black, and four colored strokes (two strokes having the same color, and other two strokes each have its own color) are located at different areas in the stroke image indicating user-desired color arrangement for these areas.

In some embodiments, the stroke image may be obtained based on user operations on the drawing board interface. For example, candidate colors may be displayed on the drawing board interface (e.g., after the "color" button is selected in the Color-Label conversion buttons section (d) of FIG. 3). A target color may be obtained based on a user selection among the candidate colors. A dragging operation is detected (e.g., on a stroke image shown on the drawing board interface) and a colored stroke of the stroke image is recorded according to the target color and positions corresponding to the dragging operation. In some embodiments, when no user input is obtained for the stroke image, the color feature is extracted from a default stroke image having a uniform color (e.g., black color).

Feature embedding acts like a way to convert the input stroke to high-intensity features. For example, the stroke image is a sparse matrix with only small areas occupied by stroke colors. It may be difficult to achieve color control if a traditional variational encoder practice is followed with this sparse matrix as input, in which case the encoding module would apply same function on each pixel and make the non-stroke areas dominant. As a result of the traditional variational encoder, only a few differences are observed among the outcomes of the encoder.

In some embodiments, the sparse matrix representing the stroke image is converted to an intense feature representation for effective control over results. The color feature embedding process is similar to an object detection process based on a regression problem. The input image (i.e., the stroke image) is divided into a plurality of grids and each grid may include zero stroke, a portion of one stroke, one complete stroke, or more than one strokes. In one example, the plurality of grids may be S×S grids. In another example, the plurality of grids may be S1×S2 grids. Different from object detection, color values from the stroke image (e.g., RGB values) can be used as object score and class score.

Mathematically, in some embodiments, taking the scenario where the stroke image is divided into S×S grids as an example, the color feature extracted from the stroke image is defined to be an array of size (S, S, 8), where S×S is the number of grids in an image and 8 is the number of feature channels. Further, for each grid/cell, a tuple of (mask, x, y, w, h, R, G, B) is defined to represent the feature associated with the grid. Specifically, a largest rectangular area which could cover one or more strokes corresponding to one grid (e.g., the top-left corner of the rectangle is within the grid and the rectangle covers whatever stroke(s) whose top-left corner is within the corresponding grid) is represented by (x, y, w, h), with x and y described in Eq. 1:

$$x = x_{image} - \text{offset}_x, y = y_{image} - \text{offset}_y$$

where $\text{offset}_x$, $\text{offset}_y$ are coordinates of an upper-left corner of the grid, $x_{image}$, $y_{image}$ represent coordinates of the upper-left corner of the rectangular area, and w and h are the size of the rectangular area (i.e., width and height). (R, G, B) are the average values for each color tone inside this grid. Further, a mask channel is added to represent whether this grid has a stroke or not, to avoid the ambiguity of black stroke input. For example, the value of mask is 0 when the grid does not include a stroke, and is 1 when the grid includes some pixels of a colored stroke (e.g., the color may be black, blue, or any other color).

The color features associated with the stroke image are inputted to an image generation model for automatically predicting/generating a desired image based on the user-input stroke image. The training of the image generation model also involves this type of color features. Specifically, when preparing a dataset for training, stroke images are generated based on original images, each original image having one corresponding stroke image. Every stroke image generated in training has valid color in each of its grids. The color of a grid in a stroke image are determined based on the color of a corresponding grid in the original image. Further, for each stroke image generated in training, in order to simulate the input colors better, a preset percentage (e.g., 75%) of its total grids are set to have all 0s among the 8 channels, which means the remaining percentage (e.g., 25%) of total grids in a stroke image have colors. In some embodiments, S is set to be 9 and the color feature array is flattened as a latent vector input for the image generator 406. For example, an array of size (S, S, 8) is converted to a one-dimensional latent vector having S×S×8 elements. The operation of obtaining the flattened latent vector may be performed at both the training stage and the testing stage (i.e., automatic image generation based on user input).

It can be understood that steps S202 and S204 does not follow a specific implementation sequence. That is, S202 may be performed before S204, after S204, or at the same time with S204, and is not limited herein. As long as the two inputs are ready (i.e., semantic labels and color feature, the generator 406 can be executed to automatically generate an image with customized colors.

The image generation may be implemented based on deep learning method such as a Generative Adversarial Networks (GAN) model. The aim of the GAN model is to find an outcome painting which satisfies both the layout indicated by semantic map and the local color indicated by the stroke image. That is, an image can be automatically generated using a GAN model according to the semantic labels and the color feature (S208). The color feature may be a latent vector input to the GAN model. The input of the GAN model includes the latent vector indicating the color feature extracted from the stroke image and the semantic labels (e.g., a semantic map). For example, the semantic map of N semantic labels is processed into N channels of label images (each channel/image representing one semantic label). A semantic label, as used herein, may also refer to an image having the same size as the original image or to-be-generated image depicting pixels corresponding a single object/entity and labeled with the single object/entity.

In some embodiments, the disclosed GAN model contains a generator and a multi-scale discriminator. The generator has the color features and semantic label as inputs explicitly. The generator includes multiple upsampling blocks arranged in series, each upsampling block corresponding to a different image resolution and including a set of convolutional layers and attention layers that accept semantic labels as shape constraints, to achieve coarse-to-fine strategy. That is, in operation, the process goes through the multiple upsampling blocks sequentially, with corresponding resolutions from low to high (i.e., an upsampling block corresponding to a coarse resolution is processed before an upsampling block corresponding to a higher resolution).

The input for the first upsampling block is the color feature and semantic labels, and the input for an upsampling block other than the first one is the outcome of its previous upsampling block. The outcome of an upsampling block is also referred as hidden features for its next upsampling block. The outcome of an upsampling block may include a painting/image having a resolution same as the resolution corresponding to the upsampling block. In some embodiments, the painting/image from the outcome of an upsampling block may be resized (e.g., doubled size, such as resizing a 8*8 image to 16*16 image) before being inputted to the next upsampling block with same configurations.

At each upsampling block, the semantic labels functioning as a shape constraint is resized to have the same resolution as the hidden features. The generator may adapt the spatially-adaptive method from GauGAN model and use resized semantic labels as attention input for the corresponding upsampling block. For example, the input of a current upsampling block corresponding to resolution 128*128 may be the outcome of the previous upsampling block corresponding to resolution 64*64; and the semantic labels used for the attention layers in the current upsampling block may be resized to 128*128. In some embodiments, the resolution corresponds to each upsampling block may be doubled from that corresponding to the previous upsampling block. For example, the resolutions may include 4*4, 8*8, 16*16, . . . , until all the way up to 1024*1024.

In the training process, the generator aims to learn how to output the original painting which the colors (i.e., from the corresponding stroke image) and semantics correspond to (e.g., configurations of the upsampling blocks). The multi-scale discriminator, on the other hand, with the generated painting/images as inputs, aims to make sure the image generated by the generator is as similar to the original one. The multi-scale discriminator is only used at the training stage.

Compared to existing technology, such as a GauGAN which does not have control on local colors of the generated image, the disclosed GAN model can generate images that accommodates both the semantic labels and local colors customized by the user through stroke image.

After the training phase, only the generator based on the trained model as well as the color feature embedding module (i.e., the module that converts user stroke image to color feature vector) work, with the user customized strokes and semantic labels as inputs. The trained model, i.e., the generator can, given color and shape constrain (i.e., from stroke image and semantic map), output pixel value (R, G, B) for each pixel position in the output image. The disclosed image generation process may be implemented in real time. For example, during inference (e.g., when the generator 406 generates image based on received user input and trained GAN model), it takes 0.077 seconds per image generation on a Tesla V100 GPU.

In the drawing board interface shown in FIG. 3, after the "draw!" button is selected in the Color-Label conversion buttons section (d) of FIG. 3, a result image generated using the disclosed GAN model based on the label input at section (a) and optional stroke image corresponding to the "color" button function. The result image may be displayed in the result section (e) of the drawing board interface.

Figure 6B:
FIG. 6B is an image automatically generated using the example semantic map shown in FIG. 6A as an input for an image generation model according to some embodiments of the present disclosure.
Figure 6C:
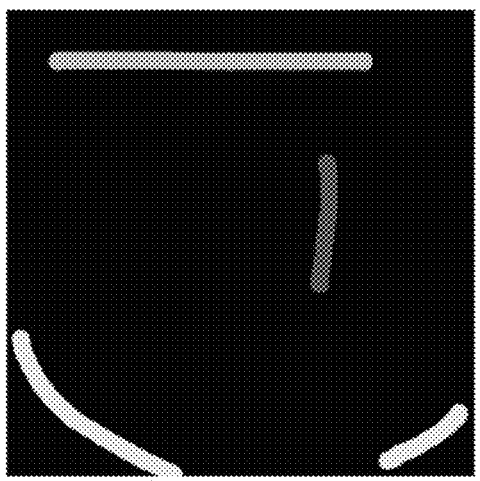
FIG. 6C and FIG. 6E are two exemplary stroke images consistent with some embodiments of the present disclosure.
Figure 6D:
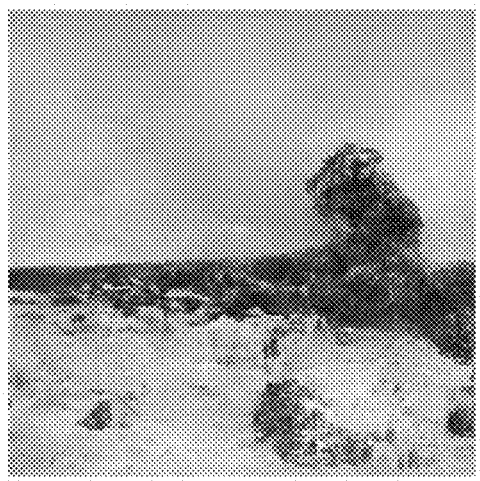
FIG. 6D is an image automatically generated using the example semantic map shown in FIG. 6A and the stroke image shown in FIG. 6C as inputs for the image generation model according to some embodiments of the present disclosure.

FIG. 6B is an image automatically generated using the example semantic map shown in FIG. 6A as an input for an image generation model (i.e., GAN model) according to some embodiments of the present disclosure (the other input for the GAN model a default stroke image, such as an all-black image). FIG. 6D is an image automatically generated using the example semantic map shown in FIG. 6A and the stroke image shown in FIG. 6C as inputs for the disclosed GAN model. As can be seen from FIG. 6B and FIG. 6D, color tone guidance can introduce different result images.

Figure 5:
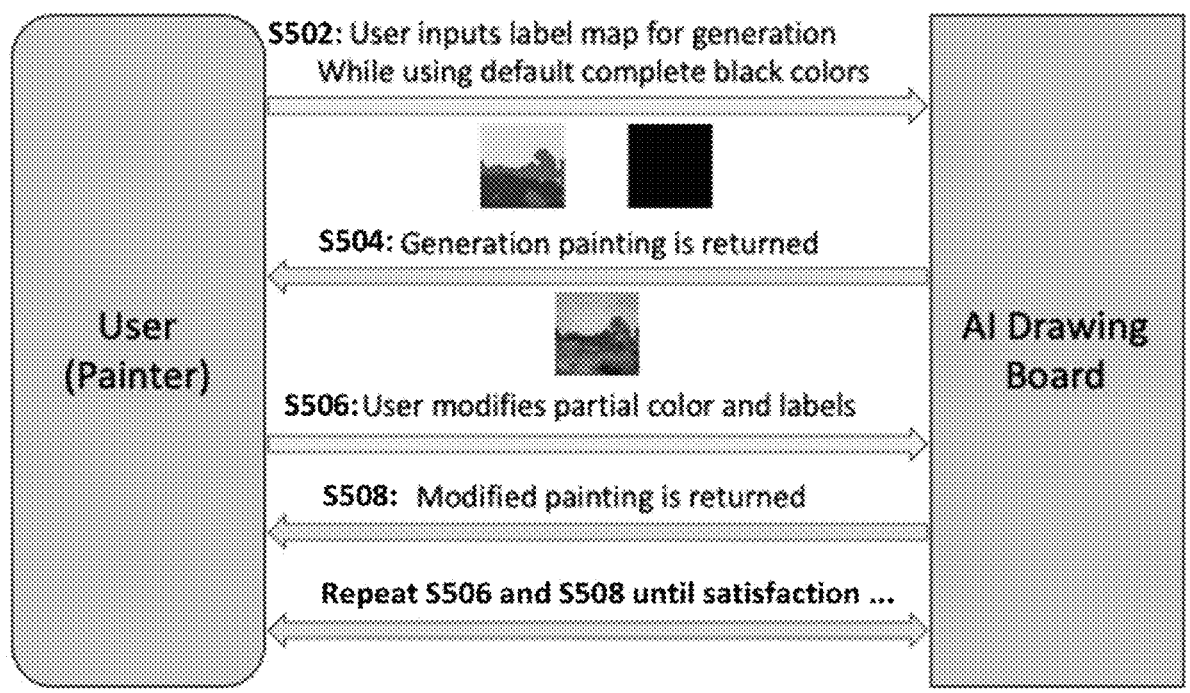
FIG. 5 illustrates another exemplary image generation and colorization process according to some embodiments of the present disclosure.

FIG. 5 illustrates another exemplary image generation and colorization process according to some embodiments of the present disclosure. In S502, user inputs label map (i.e., semantic labels in the form of semantic map) for generation while using default complete black colors (i.e., an all-black stroke image, and mask value in the color feature being 0). A painting is automatically generated using the GAN model according to the inputted semantic labels (S504). The generated image may be displayed on the drawing board interface. The user may want to modify some local shape or color of certain object in the image. That is, color and/or label may be partially modified (S506). Modifying the shape can be accomplished by modifying a desired portion in the semantic map to obtain current semantic labels. The color customization can be accomplished by providing a stroke image which is then used to extract a current color feature. Modified painting is returned (S508) using the GAN model according to the current semantic labels and the current color feature, for example, when the "draw!" button is selected. The modified painting may be displayed. Step S506 and S508 may be repeated until the user obtains a satisfying image.

In some embodiments, the drawing board interface may store images generated at each revision (e.g., each time the "draw!" button is selected) using the return painting element 4064. The generated images may be Image(1), Image(2), . . . , and Image(N), Image(N) being the currently generated image. In some scenarios, the user may prefer a previously generated image and give a return instruction, such as selecting a return button in the drawing tool and elements section (c) of FIG. 3. The drawing board interface may display a most recent image upon receiving the return instruction, such as Image(N−1). If the return instruction is received again, Image (N−2) may be displayed.

Figure 6E:
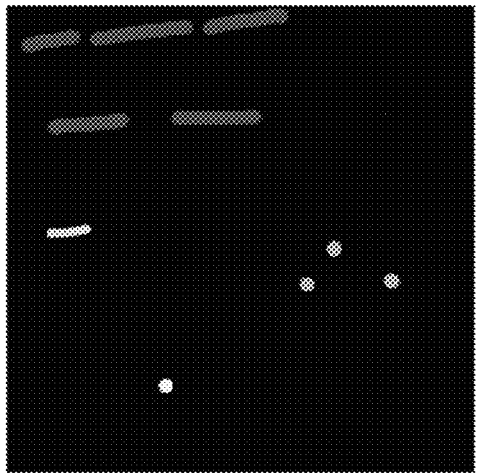
Figure 6F:
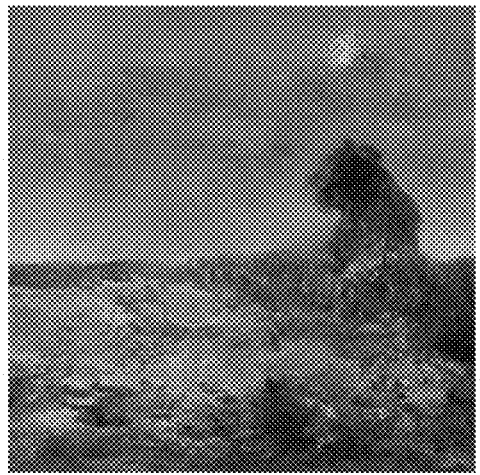
FIG. 6F is an image automatically generated using the example semantic map shown in FIG. 6A and the stroke image shown in FIG. 6E as inputs for the image generation model according to some embodiments of the present disclosure.

FIGS. 6A-6F, FIGS. 7A-7F, and FIGS. 8A-8N are three sets of examples showing different outcomes based on different semantic label inputs and color inputs. Specifically, FIG. 6A is an example semantic map. FIG. 6B is an image automatically generated using the semantic map shown in FIG. 6A as an input. FIG. 6C and FIG. 6E are two exemplary stroke images consistent with FIG. 6A. FIG. 6D is an image automatically generated using the example semantic map shown in FIG. 6A and the stroke image shown in FIG. 6C. FIG. 6F is an image automatically generated using the example semantic map shown in FIG. 6A and the stroke image shown in FIG. 6E. It can be understood that, when the semantic map is the same (e.g., FIG. 6A) but the user-input stroke images (e.g., FIGS. 6C and 6E) are different, the outcome images generated based on the stroke images and the semantic map may include same contents arranged in a similar layout, but those contents may have different color characteristics. For example, the sky is blue and clear as shown in result image FIG. 6D due to the cyan stroke drawn at the top section in stroke image FIG. 6C, but gloomy and cloudy as shown in result image FIG. 6F due to the red strokes drawn at the top section in stroke image FIG. 6E. The different color characteristics may produce entirely different aesthetic views of paintings describing the same topic.

FIG. 7A is another example semantic map. FIG. 7B is an image automatically generated using the example semantic map shown in FIG. 7A as an input for an image generation model. FIG. 7C and FIG. 7E are two exemplary stroke images consistent with some embodiments of the present disclosure. FIG. 7D is an image automatically generated using the example semantic map shown in FIG. 7A and the stroke image shown in FIG. 7C as inputs for the image generation model according to some embodiments of the present disclosure. FIG. 7F is an image automatically generated using the example semantic map shown in FIG. 7A and the stroke image shown in FIG. 7E as inputs for the image generation model according to some embodiments of the present disclosure. FIG. 7D and FIG. 7F present two paintings with similar content and layout but different color characteristics.

FIG. 8A is an example semantic map consistent with some embodiments of the present disclosure. FIG. 8B is an image automatically generated using the example semantic map shown in FIG. 8A as an input for an image generation model according to some embodiments of the present disclosure. FIGS. 8C, 8E, 8G, 8I, 8K, and 8M are exemplary stroke images, and the corresponding result images are FIGS. 8D, 8F, 8H, 8J, 8L, and 8N, respectively. For example, the stroke images shown in FIGS. 8G and 8I both include cyan dots at locations corresponding to the sky. However, stroke image FIG. 8G includes cyan dots at locations corresponding to both higher sky and lower sky, while stroke image FIG. 8I includes cyan dots just at the higher sky location. Accordingly, the result image FIG. 8H corresponding to stroke image FIG. 8G includes more color variations at the lower sky region than the result image FIG. 8I corresponding to stroke image FIG. 8I. Thus, the disclosed device enable simple color strokes to make artistic differences in the result image/paining, thereby providing users with a powerful tool to implement their creative ideas.

One of the pain points in the field of painting is that trying to be creative is time-consuming, and it is not easy to return to the previous version of creation. The disclosed system/device tackles this pain point very well. Through a few simple strokes of shapes and colors, the disclosed method quickly help the artist implement their idea. Further, if the artist is not satisfied with the effect after implementation, the artist can click the back button to quickly return to the previous edition. This can provide an efficient teaching tool in the field of art, greatly improve the efficiency of creation for painters, and reduce unnecessary labor.

To sum up, the present disclosure provides a GAN-based drawing board which assists users to generate and edit their paintings at the same time. Painters could repeatedly generate and modify their paintings by simple operations on labels and colors. The feature embedding module used is lightweight and its output serves as the latent vector input for GAN models in the generation task. In some embodiments, feature extraction limits only one set of color features per grid. In some embodiments, the result image can be improved if multiple colors are allowed in one grid.

Those skilled in the art should know that: all or part of the steps of the method embodiment may be implemented by related hardware instructed through a program, the program may be stored in a computer-readable storage medium, and the program is executed to execute the steps of the method embodiment; and the storage medium includes: various media capable of storing program codes, such as mobile storage equipment, a Read-Only Memory (ROM), a magnetic disk or a compact disc.

Alternatively, when the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Other embodiments of the disclosure will be apparent to those skilled in the art from consideration of the specification and practice of the invention disclosed herein. It is intended that the specification and examples be considered as exemplary only, with a true scope and spirit of the invention being indicated by the claims.

What is claimed is:

1. A method for image generation and colorization, applied to a computing device, comprising:
   displaying a drawing board interface;
   obtaining semantic labels of an image to be generated based on user input on the drawing board interface, each semantic label indicating a content of a region in the image to be generated;
   obtaining a color feature of the image to be generated, wherein obtaining the color feature comprises obtaining a stroke image having a same size as the image to be generated, the stroke image including one or more colored strokes input by a user, and extracting the color feature based on the stroke image; and
   automatically generating the image using a generative adversarial network (GAN) model according to the semantic labels and the color feature, the color feature being a latent vector input to the GAN model.

2. The method according to claim 1, wherein when no user input is obtained for the stroke image, the color feature is extracted from a default stroke image having a uniform color.

3. The method according to claim 1, wherein obtaining the stroke image comprises:
   displaying candidate colors on the drawing board interface;
   obtaining a target color based on a user selection among the candidate colors;
   detecting a dragging operation; and
   recording a colored stroke of the stroke image according to the target color and positions corresponding to the dragging operation.

4. The method according to claim 1, wherein obtaining the semantic labels comprises:
   obtaining a semantic map having a same size as the image to be generated, the semantic map including a plurality of regions, pixels in a same region having a same semantic label indicating the content of the region.

5. The method according to claim 4, wherein obtaining the semantic labels further comprises:
   producing the semantic map based on user drawing operations on the drawing board interface;
   receiving semantic label texts assigned by a user to the plurality of regions of the semantic map; and
   obtaining the semantic labels according to the user-drawn semantic map and the assigned semantic label texts.

6. The method according to claim 4, wherein obtaining the semantic labels further comprises:
   modifying the semantic map according to a user operation on the drawing board interface, including at least one of: modifying a first semantic label text corresponding to one or more pixels of the semantic map, or modifying a location of a region corresponding to a second semantic label text.

7. The method according to claim 4, wherein obtaining the semantic labels further comprises:
   displaying multiple semantic map templates on the drawing board interface; and
   obtaining the semantic labels according to a user selection on one of the multiple semantic map templates.

8. The method according to claim 1, further comprising:
   displaying the automatically-generated image on the drawing board interface, the automatically-generated image being a first image;
   obtaining a modification instruction on at least one of the semantic labels or the color feature; and
   generating a modified image using the GAN model according to the semantic labels and the color feature updated based on the modification instruction.

9. The method according to claim 8, further comprising:
   displaying the modified image on the drawing board interface;
   receiving a return instruction; and
   displaying the first image on the drawing board interface in response to the return instruction.

10. A device for image generation and colorization, comprising:
    a memory; and
    a processor coupled to the memory and configured to perform:
    displaying a drawing board interface;
    obtaining semantic labels of an image to be generated based on user input on the drawing board interface, each semantic label indicating a content of a region in the image to be generated;
    obtaining a color feature of the image to be generated, wherein obtaining the color feature comprises obtaining a stroke image having a same size as the image to be generated, the stroke image including one or more colored strokes input by a user, and extracting the color feature based on the stroke image; and
    automatically generating the image using a generative adversarial network (GAN) model according to the semantic labels and the color feature, the color feature being a latent vector input to the GAN model.

11. The device according to claim 10, wherein when no user input is obtained for the stroke image, the color feature is extracted from a default stroke image having a uniform color.

12. The device according to claim 10, wherein obtaining the semantic labels comprises:
   obtaining a semantic map having a same size as the image to be generated, the semantic map including a plurality of regions, pixels in a same region having a same semantic label indicating the content of the region.

13. The device according to claim 12, wherein obtaining the semantic labels further comprises:
   producing the semantic map based on user drawing operations on the drawing board interface;
   receiving semantic label texts assigned by a user to the plurality of regions of the semantic map; and
   obtaining the semantic labels according to the user-drawn semantic map and the assigned semantic label texts.

14. The device according to claim 12, wherein obtaining the semantic labels further comprises:
   modifying the semantic map according to a user operation on the drawing board interface, including at least one of: modifying a first semantic label text corresponding to one or more pixels of the semantic map, or modifying a location of a region corresponding to a second semantic label text.

15. The device according to claim 12, wherein obtaining the semantic labels further comprises:
   displaying multiple semantic map templates on the drawing board interface; and
   obtaining the semantic labels according to a user selection on one of the multiple semantic map templates.

16. The device according to claim 10, wherein the processor is further configured to perform:
   displaying the automatically-generated image on the drawing board interface, the automatically-generated image being a first image;
   obtaining a modification instruction on at least one of the semantic labels or the color feature; and
   generating a modified image using the GAN model according to the semantic labels and the color feature updated based on the modification instruction.

17. The device according to claim 16, wherein the processor is further configured to perform:
   displaying the modified image on the drawing board interface;
   receiving a return instruction; and
   displaying the first image on the drawing board interface in response to the return instruction.

18. A non-transitory computer readable storage medium, storing computer instructions that, when being executed by a processor, causing the processor to perform:
   displaying a drawing board interface;
   obtaining semantic labels of an image to be generated based on user input on the drawing board interface, each semantic label indicating a content of a region in the image to be generated, wherein obtaining the color feature comprises obtaining a stroke image having a same size as the image to be generated, the stroke image including one or more colored strokes input by a user, and extracting the color feature based on the stroke image;
   obtaining a color feature of the image to be generated; and
   automatically generating the image using a generative adversarial network (GAN) model according to the semantic labels and the color feature, the color feature being a latent vector input to the GAN model.

* * * * *